US009122821B2

(12) United States Patent
McDaniel (10) Patent No.: US 9,122,821 B2
(45) Date of Patent: Sep. 1, 2015

(54) METHOD AND SYSTEM FOR SIMULATION OF AUTOMATED PROCESSES (75) Inventor: Richard Gary McDaniel, Hightstown, NJ (US)

(73) Assignee: Siemens Products Lifecycle Management Software Inc., Plano, TX (US)

(*) Notice: Subject to any disclaimer, the term of this patent is extended or adjusted under 35 U.S.C. 154(b) by 923 days.

(21) Appl. No.: 12/787,136

(22) Filed: May 25, 2010

(65) Prior Publication Data
US 2011/0295563 A1 Dec. 1, 2011

(51) Int. Cl.
*G06G 7/48* (2006.01)
*G06F 17/50* (2006.01)

(52) U.S. Cl.
CPC ........ *G06F 17/5009* (2013.01); *G06F 2217/16* (2013.01)

(58) Field of Classification Search
CPC . G06F 17/5009; G06F 2217/16; B65G 13/04; B65G 13/06; B65G 15/64; B65G 39/00
USPC ............................ 703/6, 7; 700/113, 228, 230
See application file for complete search history.

(56) References Cited

U.S. PATENT DOCUMENTS

| 2004/0077465 | A1* | 4/2004 | Schmidt ........................... 482/57 |
| 2005/0086040 | A1* | 4/2005 | Davis et al. ...................... 703/22 |
| 2009/0315839 | A1* | 12/2009 | Wilson et al. .................. 345/173 |
| 2010/0113222 | A1* | 5/2010 | Radow .............................. 482/5 |

OTHER PUBLICATIONS

PCT International Search Report mailed Nov. 15, 2011 corresponding to PCT Application No. PCT/US2011/037273 filed May 20, 2011 (13 pages).
Nuttall, Ashly. Design Aspects of Multiple Drive Belt Conveyors, TRAIL Theses Series No. T2007/12, the Netherlands TRAIL, Research School. Nov. 26, 2007; (168 pages).
Kim, Naksoo, et al. Three-Dimensional Simulation of Gap-Controlled Plate Rolling by the Finite Element Method, vol. 30, No. 2, Jan. 1, 1990 (pp. 269-281); (14 pages).
PCT Invitation to Pay Additional Fees mailed Aug. 23, 2011 corresponding to PCT International Application No. PCT/US2011/037273 filed May 20, 2011 (6 pages).

* cited by examiner

*Primary Examiner* — David Silver
*Assistant Examiner* — Andre Pierre Louis (57) ABSTRACT

Systems, methods, and computer readable mediums. A method includes receiving a three dimensional model for a simulation that includes a first material portion that extends between first and second material handling elements. The method includes simulating motion of the first and second material handling elements and simulating an interaction between the first material portion and the first and second material handling elements. The method includes maintaining a constraint between the first and second material handling elements according to the first material portion, dynamically updating the model and displaying the simulation, and storing the model. A method for fluid simulation is also discussed.

18 Claims, 5 Drawing Sheets

METHOD AND SYSTEM FOR SIMULATION OF AUTOMATED PROCESSES

TECHNICAL FIELD

The present disclosure is directed, in general, to systems and methods for use in computer-aided design, manufacturing, using, modeling, and visualization (individually and collectively, "CAD" and "CAD systems") and in product life-cycle management ("PLM") and other systems.

BACKGROUND OF THE DISCLOSURE

Many manufactured products are first designed and modeled in CAD systems, and PLM systems are used my manufacturers, retailers, customer, and other users to manage the design, use, and disposal of various products. Improved systems are desirable.

SUMMARY OF THE DISCLOSURE

Various embodiments include a system, method, and computer readable medium. A method includes receiving a three dimensional model for a simulation that includes a first material portion that extends between first and second material handling elements. The method includes simulating motion of the first and second material handling elements and simulating an interaction between the first material portion and the first and second material handling elements. The method includes maintaining a constraint between the first and second material handling elements according to the first material portion, dynamically updating the model and displaying the simulation, and storing the model. A method for fluid simulation is also discussed.

Another method includes receiving a three-dimensional model for a fluid simulation that includes a plurality of discrete elements, and simulating a fluid interaction of a simulated fluid among the discrete elements. The method includes assigning connectivity between at least two of the discrete elements according to the fluid interaction and updating the model according to the fluid interaction. The method includes displaying and storing the model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Automated devices are commonly used for manufacturing purposes, such as wrapping, folding, cutting, or otherwise handling thin flexible material like paper or cloth, working with rigid bodies, and working with fluids.

When used with flexible materials, such devices are used to make printed materials like newspapers and books, wrap products like food and packages, and weave or sew cloth and thread. The flexible material may be the product itself, such as the paper in a newspaper, or it can be part of the machine, such a wiring harness that flexes as a different parts of the machine move. The flexible material is often manipulated by rolling it on a spool or passing the material between sets of rollers. When the material passes through a set of rollers it is called a "web." The rollers act to guide the material and can be moved to adjust the tension of the material.

In general, simulating thin flexible materials is difficult because their most prominent properties are their local flexing on an object that is potentially large but is very small in one or two dimensions. Each part of a flexible material can move independently requiring the simulation to track a potentially very large state. Furthermore, each part of a flexible material can interact with a large number of other possible objects, including other parts of itself. To make simulation possible and to improve simulation performance, the approximations that are used to represent the flexible materials can be very important.

Rigid body simulation approximates objects by representing them as a set of point masses in space called "bodies." The bodies are transformed by incremental time steps in accordance with Newtonian physics. Normally, a body in rigid body physics has six degrees of freedom: the three directions of motion and three angles of rotation. A rigid body constraint restricts the motion so that a pair of bodies can only move in certain ways relative to one another. For example, a body representing a door may only be allowed to rotate at its hinge with respect to another body representing the wall. A constraint is represented in this example as the relative velocities of each pair constrained bodies for each of the six degrees of freedom and an offset of how much error has accumulated in the bodies' positions.

In "cloth simulation," a flexible material is represented by logically splitting it into smaller parts. Each part is a rigid body point mass or body. The points of cloth are joined to its neighboring points using constraints. Some constraints restrict the maximum distance one point can be from the next and control the size of the material. Other constraints control the angle between sets of points and designate spring-like forces. This controls the material's flexibility and overall shape. The bodies in a cloth simulation are normally simulated with fewer parameters than other bodies in a rigid body simulation. For example, the cloth bodies may not have angular momentum, rotational inertia, or torques because the rotation of the cloth object could be manifested in the overall behavior of the points but not any one point in particular. By reducing the representation of the cloth bodies, the simulation of cloth bodies can be made more efficient in storage size and computation than the equivalent number of complete bodies.

Collision detection can be used in conjunction with rigid body simulation to let bodies touch one another. Collision detection produces rigid body constraints dynamically based on the positions, sizes, and shapes of the objects in the simulation. When two or more objects come close enough to touch, the collision detection algorithm generates a constraint between the two bodies that prevents them from passing through each other. Collision detection can be performed with cloth objects as well. Each point of the cloth simulation can potentially collide with other objects in the simulation as well as other points in the cloth.

Collision detection can be further augmented with "conveyor surfaces." Collisions occur between pairs of surfaces. Normally, the relative velocity of the two surfaces at the point of contact is determined by the velocity and rotation of the moving bodies. However, by manipulating the relative surface velocity, one can make the objects behave as if one or the other or both of the surfaces are moving. For example, the top surface of a fixed rectangular block can be made to act as though its surface was moving. Objects that fall on the block would move in the direction of the surface. In effect, the top of the block would act like a conveyor belt even though no part of the block actually moves as a rigid body.

Simulating rollers with a web of material in not typically performed in the industry. When estimating the size and strength needed for a given machine, the web is analyzed statically using mathematics software. For a given configuration, the designer calculates the path each section of the material will pass through the machine. The tension of the material can be estimated by treating the rollers as pulleys and making assumptions about how much the material will stretch. These calculations are carried out at the discretion of the designer. Though a computer may be used to aid calculation, the process is handled effectively by hand and produces numeric results. The design is not simulated, animated, or otherwise made accessible to a control algorithm in known systems.

As an aid to carry out the static calculation, the designer may use a computer program with a discrete representation of the web's components. The designer lays out circles to represent rollers and lines to represent the material between the rollers in a 2D graphical editor. Software can calculate how the forces would propagate in 2D and produce numerical results. However, the software does not simulate the configuration by running it interactively. The roller and material objects are static.

Cloth simulation is used primarily in computer generated graphics such as in video games and movies. Cloth simulation can be used to model a character's clothing or other flexible materials in the scene. When used in this way, the simulated cloth may either float free or be fixed along one edge. The unattached parts of the cloth move around and are allowed to dangle or float. The cloth is never stretched between rollers or rolled on a spool. It is also never threaded through a complex mechanism. The cloth in this situation is used for visual effect and is not part of a mechanical simulation.

Automated conveyor belts are simulated using the conveyor surface approach or with an ad hoc algorithm. Some conveyor belts are made from a material that is stretched over rollers to form a loop. In this case, a conveyor belt might be considered a simple roller simulation. However, the conveyor simulation outside of the present invention is not generalized to other configurations of rollers and material. The material does not move, get spooled, or get unfurled. In most conveyor simulations, the rollers are not even simulated.

Known systems related to cloth processing cannot be used to simulate interactively a general automated process where a thin material is conducted through rollers. Analytical design either by hand or with the aid of computer software can help determine how a web should be built but it does not run interactively with a control algorithm. Cloth simulation, as it is currently used, does not handle common automation tasks such as rolling, spooling, unrolling, or anything that requires the material to interact mechanically with other objects. A conveyor belt simulation is too limited to simulate a system with a material passing over many rollers.

Disclosed embodiments discussed in more detail below include systems and methods for simulation of machines that process cloth and other flexible materials.

Fluid behavior is also common in automation processes. There might be gases flowing in pipes or a liquid filling a container. Fluids are characterized by their ability to flow continuously from one place to another and for gases to expand to fill their container. It is useful to be able to simulate fluids for the purpose of simulating the behavior of a controlled process. Automation is used to control fluids in fields such as brewing, bottling, water treatment, and chemical production. The control system is used to perform duties such as setting heaters, opening and closing valves, and activating motors. It uses data from the process such as temperature and pressure sensors to manage its control.

Testing control algorithms in any automation application can be very important in any of these areas. It is preferable to test algorithms in an environment where there is little risk if the control should fail. Creating a virtual environment where all the interactions take place in a "virtual" environment in a computer can be particularly desirable, and it such a virtual environment should preferably exhibit enough of the behaviors of the real environment to make tests meaningful. Similarly, the method for constructing the test environment should be meaningful to the developer so that simulation itself as well as its results will be clear and to reduce errors in the simulation.

Disclosed embodiments can be used in situations where a simulation of flexible materials and other materials must be relatively fast. Disclosed systems and methods can simulate the automated device so that control algorithms may be tested in a time frame that is comparable to the speed of the actual device being simulated.

Figure 1:
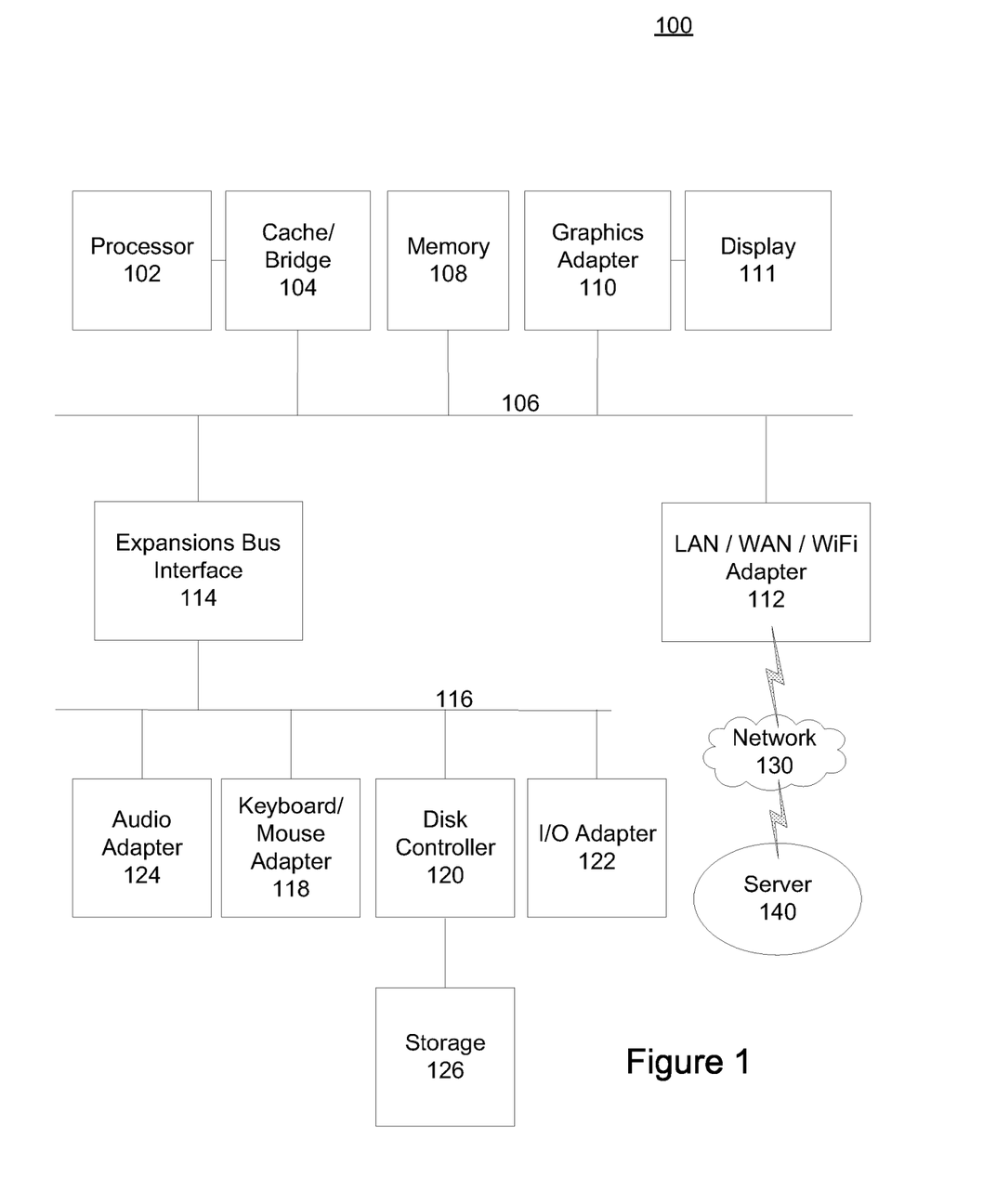
FIG. 1 depicts a block diagram of a data processing system in which an embodiment can be implemented.

FIG. 1 depicts a block diagram of a data processing system in which an embodiment can be implemented and configured to perform processes described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/Ol adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Various embodiments disclosed herein include systems and methods to simulate automation tasks that involve rolling, spooling, and otherwise manipulating sheet-like material such as cloth and others, generically referred to as "material" below. Such systems and methods can be implemented, for example, using one or more data processing systems as described above. Rollers are a common method for dispensing a material into a process or for collecting a material that is being produced. Simulating a sheet stretched between two rollers is handled at different levels of detail depending on the situation. Rollers are modeled as objects in a rigid body physics model. Spools are rollers that collect or dispense product and will change physical values as the roll grows or shrinks. A taut connection between rollers is simulated as a physical constraint between the angular positions of the rollers. The sheet between the rollers is modeled as a fixed conveyor surface. The sheet of material between a slack connection is simulated with cloth simulation. Like the taut connection, the cloth stays in place while its surface is simulated as moving.

Various embodiments disclosed herein also include systems and methods to simulate fluid behavior in a simulated process using one or more data processing systems. Disclosed embodiments incorporate the geometric character of the fluid's vessels, controls, sensors, and piping into the simulation without resorting to a finite element style of simulation. Disclosed embodiments incorporate 3D models of the devices being controlled into a discrete element formulization to calculate the results of the simulation. The system interacts with a user to assemble the simulation by creating and laying out the elements of the process in a 3D graphical user interface environment. The elements resemble the physical components of the system being simulated because they have the same relative size and shape. Simulation elements are derived and parameterized from the 3D model. Because it is based on a discrete model, the simulation can run in real time, interactively. Because the model uses the 3D geometry, properties of the simulation are defined implicitly reducing the developer's need to encode many simulation behaviors.

Using the 3D model for such a simulation helps prevent errors because the size and layout of the components in both the system and simulation dictate much of their behavior. The developer can also see whether the displayed simulation looks like the physical device. When running the simulation, the 3D model also acts as a visualization of the process eliminating the need to have a separate visualization system.

For flexible and other materials, various embodiments simulate a web of rollers using rigid body constraints to simulate the interaction between rollers and use cloth simulation to simulate the material between rollers. Instead of simulating the material as a continuous piece that touches the rollers through collision detection, the material is separated so that it is only simulated as cloth when it is between rollers. The parts of the material that are in direct contact with a roller are removed from the simulation. In essence the material passing through the web is simulated by a set of objects that are mostly fixed in position. The sheets of material stay still while the rollers turn. Constraints calculate how the position of one roller affects the positions of others that are connected to it via the material. The surface of the fixed sheets of material is represented with a conveyor surface so that when other objects touch the material, they move with the direction the material is flowing through the machine.

Figure 2A:
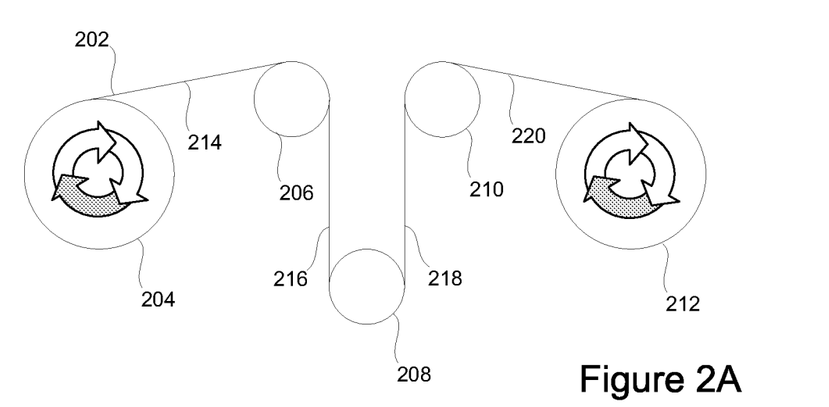
FIGS. 2A and 2B illustrate example roller configurations in accordance with disclosed embodiments.

FIG. 2A illustrates an example roller configuration, and is presented in 2D for clarity, but it represents a 3D web configuration. The material 202 begins on spool 204, then it passes over roller 206, under roller 208, and then back over roller 210. Finally, material 202 is rolled back onto spool 212. The rollers and spools represent cylindrical objects in 3D and the material has a matching depth. To simulate this configuration, system divides the material into four rectangle sections, 214, 216, 218, and 220.

Figure 2B:
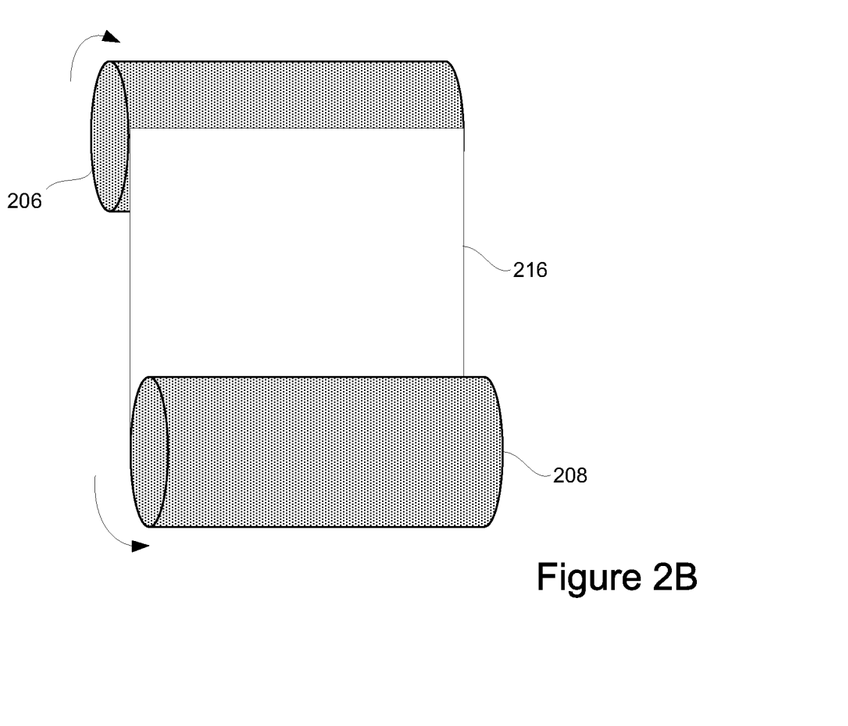

FIG. 2B shows three-dimensional (3D) perspective of a portion of FIG. 2A. Here, section 216 of the material 202 is shown positioned relative to rollers 206 and 208. In this example, the material 202 stays taut so, that it remains flat in the simulation. The system represents each section of material with a single, flat, rectangular object that meets the rollers at the edge where the material just starts to go around the curve.

For the purposes of explanation, a spool of material can be considered a kind of roller. In that way, the material connection between spool 204 and roller 206 can be generalized as the same kind of connection between roller 206 and roller 208. Similarly, a material connection between two spools would be the same thing.

Various embodiments use constraints to link the motions of the rollers. Constraints link the rollers in pairs according to which rollers are connected by material. In the example, spool 204 is linked to roller 206, roller 206 is linked to roller 208, roller 208 is linked to roller 210, and roller 210 is linked to spool 212. The constraints link the angular velocity and angular position of the rollers.

If spool 212 turns clockwise as shown in this example, then roller 210 is turned clockwise by the constraint linking roller 210 and spool 212. The amount that roller 210 is turned is determined such that the length of material between roller 210 and spool 212 (section 220) is kept constant. In this case, assuming that section 220 does not stretch, roller 210 and spool 212 will rotate in inverse proportion to the ratio of their radii. Because roller 210 is linked to roller 208 and roller 208 is linked to roller 206 and so on, rotating spool 212 causes all five of the rollers and spools to rotate together.

When simulated, in some embodiments, the material sections in the example are not moving. For example, section 216 is FIG. 2A is always located in the same place between rollers 206 and 208. However, the in various embodiments, the system treats the material as moving by applying to it a conveyor surface; for example, if roller 206 is rotating clockwise, then the material section 216 is given a downward surface velocity. The section object 216 stays motionless but its surface is given a velocity that corresponds to the rollers' rotation. If another object were to touch the material's surface, it would act as though it struck a moving object.

There are a number of factors that the system can process in order to use this method to simulate rollers. The kinds of properties that the system can determine include:

How taut or slack the material between each roller is;
The length of the material between the rollers;
How much material is being added or removed between rollers;
How much material to add or remove from sections that have a free edge;
Whether the material is tightly bound to a roller or whether it is slipping;
How far the material is shifting along the axis of a roller;
The angles where the material attaches to the roller;
The locations where the material ends (assuming the material is not continuous); and
The size, mass, rotational inertia, and torques of spools of material as they wind or unwind.

The simulation is constructed with the assumption that the simulated machine is mostly stable and does not change often. Events such as material coming off of a roller or material significantly accumulating between rollers are relatively rare, both in practice and in simulation. Most of the time, the material in the system has a consistent tension and position. Though the material is moving, its shape within the mechanism does not change. When the system does have a more significant change, the material involved is reconfigured to reflect the new arrangement. For example, two material pieces may become one, one piece may be divided, the number of segments in a material may be increased or decreased, or the segments may also grow or shrink.

The state of the material between rollers is determined by the constraint that links the rollers. The constraint determines how much material is between the rollers along with its tension, length, and mass. For example, if the material is taut, then the simulated surface is a flat plane and the amount of material in the plane is equal to the length of the plane. If the material is less taut, it may stretch before causing rollers to turn. Stretching will increase the tension, decrease the mass, and keep the length the same. It is the nature of rigid body constraints that values can propagate to all bodies equally. An increase in material tension will affect both connected rollers equally. The constraint needs only to determine how the motions of the rollers are related and does not have to actually move the rollers.

The tension of the material also adds a torque to the roller. Normally, this torque will be balanced by the torque of the material on the opposite side. Since the rotation of the rollers is being handled by constraints, the sum of the material torques are added together and converted into a force that is applied to the roller's center of mass. Thus, if the roller is attached to a spring or other kind of force measuring appliance, the spring will extend and contract depending on the tension of the material passing over the roller.

If a paired set of rollers turn in opposite directions relative to how the material passes over them, then the constraint will determine that the length of the material between the rollers is increasing. Disclosed embodiments manage this excess material by dividing the single rectangular sheet into a series of connected segments and using cloth simulation.

Figure 3A:
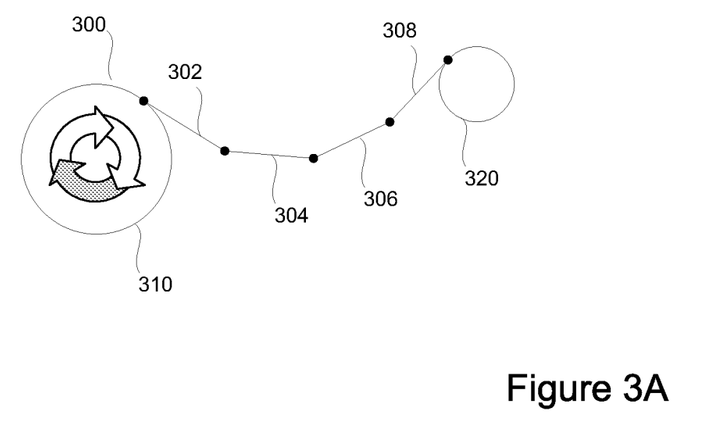
FIG. 3A shows an example of a connection between a spool and a roller going slack.

FIG. 3A shows an example of a connection between a spool and a roller going slack, such as between spool 310 and roller 320. The single rectangular sheet 214 shown in FIG. 2A is replaced by four smaller rectangular sheets 302, 304, 306, and 308 (endpoints shown for clarity). The number of pieces a material section will be divided into depends on the size of the section, the flexibility of the material, and the desired amount of accuracy of the simulation. The end points of the material 300 at spool 310 and roller 320 are fixed in space to the position of the roller just like the original single piece was fixed. However, the other points are allowed to dangle in space.

Like before, the overall motion of the material section is fixed. The interior points are allowed to move but are restricted by the cloth simulation to a relatively small area. The material is still flowing in simulation, though, and each segment of the material has a surface velocity that is set equal to the speed the material is flowing through the machine. If a section of material is sufficiently long, it may be necessary always to simulate its position with cloth simulation. A long object will always sag to form a catenary and would not be straight enough to simulate as a flat rectangle.

If material is added to a section simulated by material simulation, the length of the material will increase. Various embodiments may increase the length by either increasing the length of each material segment or by adding more segments or both. The newly formed material section is initialized to have the same density and velocity characteristics as the original section. Adding a new segment may be accomplished by added the segment to either of the fixed ends of the material thereby making a new fixed end one segment further up the roller and then moving the new fixed end to follow the roller as it pays out the material. Decreasing the length of the material is handled in the same manner. A material section that grows and shrinks often during the simulation will use pre-allocated space so that it need not perform costly memory allocation routines as often.

Figure 3B:
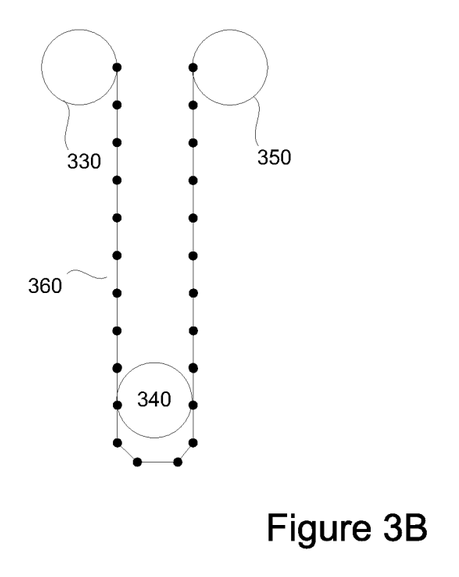
FIG. 3B shows a case where the slack between rollers cause the material to separate completely a roller, in accordance with disclosed embodiments.

It is possible for material to go slack such that it stops touching a roller. FIG. 3B shows a case where the slack between rollers 330 and 340 and rollers 340 and 350 cause the material to separate completely from roller 340. In this case, the material sections that were originally taut, as in sections 216 and 218, as in FIG. 2A, are merged along with the virtual piece of material that would have been touching roller 340 to form a new section 360, which can be maintained as a plurality of connected sections as shown in FIG. 3B.

The original constraints between rollers 330 and 340 and rollers 340 and 350 are replaced with a single constraint between rollers 330 and 350. The mass, tension, and local velocity of the new section 360 (and each of its constituent connected parts) is initialized to match with the corresponding attributes of those sections as they would have been if connected as in sections 216 and 218 if FIG. 2A. The interaction between roller 330 and section 360 becomes the same as collision detection for material simulation.

The reverse case where a material draped over a roller causes the roller to become simulated with constraints is also possible. In this case, the objects touching the material are tracked. Those objects that are tagged as rollers are tested to see if their angular velocity is similar to the surface velocity of the material. Also, the angle of surface contact with the roller is checked to see if it passes a threshold value. When these tests are passed, the material section is divided such that the part touching the roller is removed and the end points of the two new sections are fixed to the position of the roller. The mass and velocity of the new sections are adjusted to match the portions of the original material. The constraint between the original rollers is removed and two new constraints between the original rollers and the new roller are added.

Various embodiments disclosed herein can handle discontinuous sheets of material by eliminating one or both of the fixed end points as the material moves in the simulation. In normal operation, the sheet of material is fixed at both ends at the edge where it meets the roller. In cases where the material is being threaded through the machine or being cut into pieces, at least one of the ends will not be touching a roller. If the material is being fed or retracted from the other side, the size of the material simulation will grow or shrink in correspondence. Material segments may be added or removed and the length of the segments may be grown or shrunk. If both sides of the material simulation become free, it becomes an object independent from the rollers and the roller constraints. The freed object will move and interact as a normal material simulation with collision detection and will not have a surface velocity.

To reconnect a freed material back to a roller, a simulation in accordance with disclosed embodiments detects if a free material object is touching a roller object. If the material is aligned with the roller and it makes sufficient contact, the portion of the material that contacts the roller is removed. The edges where material gets removed become fixed to the position of the roller. The roller constraints on either side of the roller are regenerated to conform to the new configuration. If the material joins two rollers then the new constraint joins the rollers rotation. If the material only joins the one roller, then there is no constraint added and the system will modify the length of the free material object.

A simulation in accordance with disclosed embodiments treats material that is rolled or unrolled onto a spool as though the spool itself were growing or shrinking. The spool increases or decreases its radius and mass as material is added or removed. A torque must be applied to the spool in order to account for the change in mass and rotational inertia. A special condition occurs if the spool is completely unwound so that it breaks its fixed end point with the material section and eliminates its constraint with the next roller if it has one. Similarly, if a free end of material simulated as material makes sufficient contact with a spool, the material is joined to the spool. If the joined material connects to a roller on other end, a constraint is set up to manage the rotation.

The systems disclosed herein for simulation of cloth processing include significant advantages over known systems, which do not perform similar simulation. By using constraints between rollers and simulating the movement of material with a conveyor surface, a system in accordance with disclosed embodiments significantly reduces the computation expense of simulating a web of rollers. Computing constraint satisfaction for a pair of rigid body rollers is very efficient. By not having to simulate the entire flexible material as many small pieces, a system in accordance with disclosed embodiments allows devices such as a printing press or a weaving machine to be simulated at interactive speeds.

In general, without the disclosed techniques, simulating a material web is not performed in known systems. Finite element simulations tend to be used for fluid simulation or modeling the rigidity of mechanical frames.

The combination of cloth simulation, rigid body constraints, and conveyor surfaces has not been used before to simulate a web of rollers or to simulate material flow in an automated device.

Figure 4:
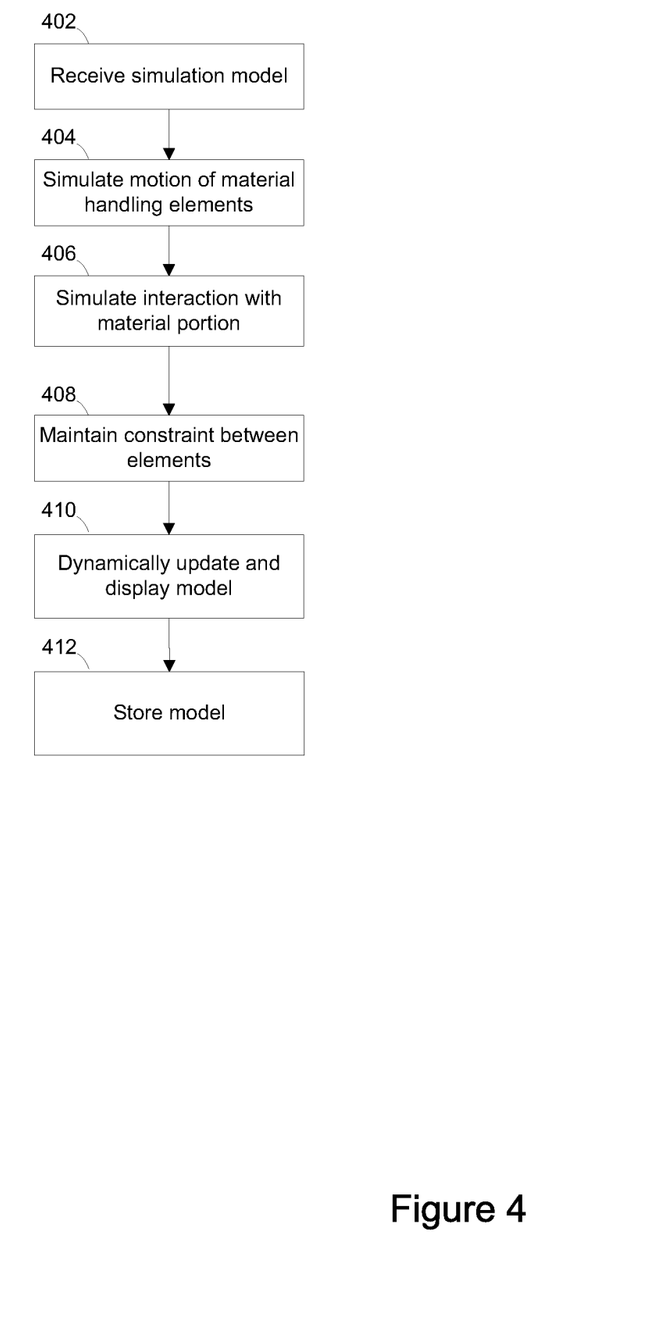
FIGS. 4 and 5 depicts flowcharts of processes in accordance with disclosed embodiments.

FIG. 4 depicts a flowchart for simulating flexible material machinery in accordance with disclosed embodiments.

The system receives a three-dimensional model of an assembly that includes a first flexible material portion that extends between first and second material handling elements (step 402). The assembly can be, for example, part or all of an automated machine for handling cloth or other flexible materials. Receiving, as used herein can include loading from a storage, receiving from another system such as over a network, or interacting with a user to build such a model. The material-handling elements can be, for example, simulated rollers, spools, conveyors, or simulated devices as may be found in such an automated machine. Of course, in various implementations, there may be several or many of each of these elements.

The system simulates motion of the first and second material handling elements (step 404).

The system simulates the interaction of the first flexible material portion and the first and second material handling elements (step 406). This step can include different processes, as described herein, depending on the relationship of the various elements.

For example, when the simulated material is taut, the system can simulate the first flexible material portion as a solid rectangular object with a surface velocity corresponding to the motion and locations of the first and second material handling elements.

In other cases, the system can subdivide the first flexible material portion into a plurality of connected second material portions.

In other cases, endpoints of the first flexible material portion are fixed in space relative to the locations of the first and second material handling elements.

Other cases as described herein can also be simulated as a part of step 406.

The system maintains a constraint between the first and second material handling elements according to the first flexible material portion (step 408).

The system dynamically updates the model, including displaying the simulation to a user (step 410). The system stores the model, including any updates (step 412).

Note that various steps in the processes described herein may be performed repeatedly, concurrently, or in a different order than described.

Disclosed systems and methods can also effectively simulate fluid behavior. Simulating fluid behavior has been accomplished using two very different methods. The first is the finite element approach. In a finite element model (FEM), the volume of a fluid's container is logically divided into many smaller volumes or elements.

The properties of the fluid in each small element are assumed to be constant within that space. The simulation models the physical interactions between each of the small volumes such as transfer of pressure, mass, and velocity. Effectively, the computer must perform many computations for each of the many small volumes. The smaller the space is divided, the more accurate the results of the simulation will be, but having smaller elements means needing many more of them to fill up the space. This causes the data size of the problem and the amount of computation required to be large. In known systems, it is generally not possible to perform a finite element simulation quickly enough to interact with the user or the control system in real time. Since the usual automated process requires several fluid vessels with various piping to connect them, a finite element approach cannot function effectively for real time responses.

A significant disadvantage of the FEM method is that it is too computer intensive to be carried out quickly. It does not scale to the size of typical automation process. It is also a difficult method to use, generally. To use FEM requires the developer to understand complex physical equations and how to apply them. FEM toolkits are often rudimentary and require the developer to custom program the majority of the system's behavior. The results of FEM are also difficult to visualize and interpret often requiring advanced expertise.

Another method to simulate fluids is to model the entities of the process as discrete elements. The elements are implemented as objects with a set of numeric properties. A boiler, for instance, might have pressure, temperature, and volume properties. The fluids in the model are implicitly represented by the behavior of the elements. A pipe element, for example, may have a viscosity parameter to model how quickly the fluid will flow through it. The fluid, however, is not a separate entity in the model even though viscosity is really a property of the fluid and not the pipe. The simulation is constructed from several of these discrete elements being connected together. For example, a boiler element may be attached to a valve element which may be in turn attached to a pipe element. The attachments between elements are purely logical and though they will follow the same arrangement as their real world counterparts, they are not placed with any geometrical consideration with respect to one another. In other words, the discrete model of a one meter long pipe with a diameter of five centimeters is just the pairing of the parameters length and diameter in an object. There is no tubular shape that is one meter long and five centimeters wide in the system.

To compute the simulation using the discrete method, the computer determines the interactions between the elements. This is similar to how the FEM works. Pressure, mass, and velocity are computed at the interface between each element. Each element, in turn, will compute how its own parameters and each of its interfaces will react to the changes in the other interfaces. A solver is used to normalize all of the parameters to produce a numerical result for each time step. Since there are many fewer elements in a discrete model than a FEM, it is possible to run the simulation interactively so it can keep up to speed with a controller and user input.

One disadvantage of a discrete element method is that it abstracts away the geometric contribution of the physical system. The user is required to parameterize the simulation elements numerically so that they reflect the proper physical properties. There is no way for the system to know if the parameters are even physically plausible. A discrete simulation is a purely logical calculation like a spreadsheet. The contributions of physical proximity and size must be recreated by the developer through explicit encoding.

A method for fluid simulation as disclosed herein uses a discrete element solver technique and introduces geometric data back into the calculation with 3D data. A system as disclosed herein can receive or interactively build a 3D model of the system to be simulated. By modeling the process devices in 3D as they would appear physically, it is possible to use the geometric configuration as data for the simulation.

The system can interact with a user to create the simulation by creating and laying out the elements of the process in 3D. Properties like the size and shape of pressure vessels, the orientation of one vessel with respect to another, the plumbing, and the positions of actuators and sensors are all made known through the 3D model. A system in accordance with disclosed embodiments uses the 3D geometric data to perform fluid simulation. For example, a vessel filled with liquid tracks the current height of the liquid and can note which sensors and valves the liquid covers. A pipe tracks the location of pressure waves along its length so that it knows the speed of the contained fluid as well as sensor values along its length. A heat exchanger calculates the area of contact between two fluids to determine the rate of heat transfer.

A system in accordance with disclosed embodiments uses a discrete element formulization to calculate the results of the simulation. However, the elements of the discrete simulation are designed to incorporate the 3D geometry. Thus, interactions between elements can be specified both directly and implicitly. For example, a container of liquid might be poured into an adjacent container through a valve. The containers and the valve would be specified directly by the developer by drawing them into the model via an interaction with the system. However, the destination of the poured liquid can be specified implicitly. When the valve is open, the liquid is poured into whatever container is below it. If the destination container changes over time, such as a bottle moving in a bottling plant, the liquid will be poured into a different container depending on the circumstances. The developer never directly makes the connection between the valve and the bottle. The geometric proximity of the two objects during simulation dictates the proper behavior.

Another example is a set of pressure sensors in liquid-filled tank. The size and shape of the tank as well as each pressure sensor is specified with the 3D model. When the tank is filled, the sensors at the bottom of the tank will become active before sensors at the top of the tank. Furthermore, the sensors at the bottom of the tank will have a higher pressure than sensors at the top depending on the height of the liquid. The system can determine the appropriate values for the sensors because it knows how the liquid will fill the tank and where the sensors are within the tank.

A system in accordance with disclosed embodiments defines discrete elements that use the 3D model and modify the model as the simulation progresses. Also the 3D model dictates the connectivity of the discrete elements dynamically. As an object moves, the simulation element associated with that object searches in space for an object with which it interacts. If it finds such an object in its space, the discrete element is connected dynamically to the element of the interacting object. Special consideration, such as error handling, must take place when a discrete element is meant to interact with another but there is no connection. For example, a valve might pour liquid into empty space prompting an error message.

Using the 3D model also allows the liquid simulation to interact with other kinds of 3D methods such as rigid body simulation. For example, the pressure of a steam vessel might apply a force on a rigid body causing it to move. To create these kinds of interactions, the discrete elements must implement a coupling function. The coupling function describes how the fluid behavior generates forces in the rigid body model and where they are applied. The change in the position of the bodies will, in turn, modify the behavior of the fluid such as releasing the pressure. However, the full behavior of the fluid such as splashing need not be modeled as this would necessitate a finite element model of the fluid.

A 3D model helps prevent errors because the developer can see that the device actually looks like its physical counterpart. The developer need not create a separate visualization display because the drawing of the simulation, itself, is the visualization. The discrete elements use the 3D data to determine and manage their state. Thus, it is straightforward to update the 3D model with the current state of the elements. The developer can see the model change and move with the state of the simulation. Since the developer can see the simulation as it appears physically, it can be easier to see where problems occurs in the simulation because there will be physical incongruities at the problem areas.

Figure 5:
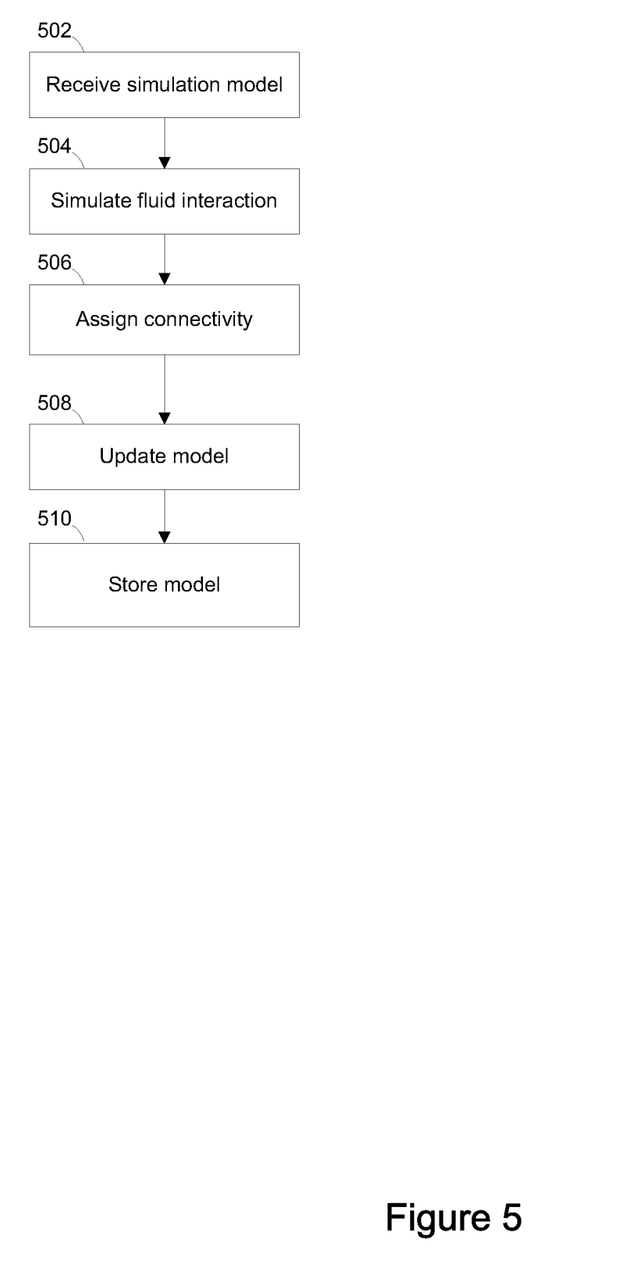

FIG. 5 depicts a flowchart of a process for fluid simulation, in accordance with disclosed embodiments, that can be performed using one or more data processing systems 100.

The system receives a three-dimensional model of a fluid assembly that comprises a plurality of discrete elements (step 502). As described above, receiving can include loading from storage, receiving from another system such as over a network, or interacting with a user to build such a model.

The system simulates a fluid interaction of a simulated fluid among the discrete elements (step 504). This step includes displaying the simulation.

The system assigns connectivity between the discrete elements according to the state of the three-dimensional model (step 506), which can include any fluid interaction. This step can include implementing a coupling function between one or more pairs of the discrete elements.

The system updates the model according to the fluid interaction (step 508). This step can include using 3D data associated with each of the discrete elements to simulate the interactions between the discrete elements and the simulated fluid. This step can include using a discrete element solve process, including the 3D data, to update the model.

Note that steps 504-508 in particular may be performed concurrently and repeatedly to display a dynamically-updated fluid simulation of the 3D model.

The system stores the model, including any 3D data (step 510).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). Various embodiments include computer readable media encoded with computer-executable instructions that, when executed, cause one or more data processing systems to perform processes as described herein.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for simulating flexible material machinery, comprising:

receiving a three dimensional model for a simulation in a data processing system, the model including a first material portion that extends between first and second material handling elements;

simulating motion of the first and second material handling elements by the data processing system;

simulating an interaction between the first material portion and the first and second material handling elements by the data processing system, wherein the data processing system removes and does not simulate any material portions in contact with the first or second material handling elements;

maintaining a rigid-body constraint between the first and second material handling elements according to the first material portion by the data processing system;

dynamically updating the model and displaying the simulation by the data processing system, including using the rigid-body constraint to calculate how the first material handling element affects a position of the second material handling portion; and storing the updated model by the data processing system.

2. The method of claim 1, wherein the system simulates the first material portion as a solid rectangular object with a surface velocity.

3. The method of claim 1, wherein the first material portion is subdivided into a plurality of connected second material portions.

4. The method of claim 1, wherein the first material handling element represents a simulated spool.

5. The method of claim 1, wherein the second material handling element represents a simulated spool.

6. The method of claim 1, wherein the first material portion represents a conveyor surface, and dynamically updating the model and displaying the simulation includes, when a simulated object touches the first material portion, the simulated object moves with a direction the first material portion is flowing.

7. The method of claim 1, wherein the rigid-body constraint links an angular velocity and angular position of the first and second material handling elements.

8. The method of claim 1, wherein the system simulates the first material portion, when the first material portion is moving, as an unmoving solid rectangular object with a surface velocity.

9. The method of claim 1, wherein the rigid-body constraint determines a simulated amount, tension, length, and mass of the first material portion.

10. A data processing system comprising a processor and accessible memory, the data processing system particularly configured to perform the steps of:

receiving a three dimensional model for a simulation, the model including a first material portion that extends between first and second material handling elements;

simulating motion of the first and second material handling elements;

simulating an interaction between the first material portion and the first and second material handling elements, wherein the data processing system removes and does not simulate any material portions in contact with the first or second material handling elements;

maintaining a rigid-body constraint between the first and second material handling elements according to the first material portion, including using the rigid-body constraint to calculate how the first material handling element affects a position of the second material handling portion;

dynamically updating the model and displaying the simulation; and storing the updated model.

11. The data processing system of claim 10, wherein the system simulates the first material portion as a solid rectangular object with a surface velocity.

12. The data processing system of claim 10, wherein the first material portion is subdivided into a plurality of connected second material portions.

13. The data processing system of claim 10, wherein the first material handling element represents a simulated spool.

14. The data processing system of claim 10, wherein the second material handling element represents a simulated spool.

15. The data processing system of claim 10, wherein the first material portion represents a conveyor surface, and dynamically updating the model and displaying the simulation includes, when a simulated object touches the first material portion, the simulated object moves with a direction the first material portion is flowing.

16. The data processing system of claim 10, wherein the rigid-body constraint links an angular velocity and angular position of the first and second material handling elements.

17. The data processing system of claim 10, wherein the system simulates the first material portion, when the first material portion is moving, as an unmoving solid rectangular object with a surface velocity.

18. The data processing system of claim 10, wherein the rigid-body constraint determines a simulated amount, tension, length, and mass of the first material portion.

* * * * *